US008744198B1

(12) United States Patent
Kainz

(10) Patent No.: US 8,744,198 B1
(45) Date of Patent: Jun. 3, 2014

(54) IMAGE COMPRESSION AND DECOMPRESSION

(75) Inventor: Florian Kainz, San Rafael, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1546 days.

(21) Appl. No.: 11/943,561

(22) Filed: Nov. 20, 2007

(51) Int. Cl.
*G06K 9/36* (2006.01)

(52) U.S. Cl.
USPC ........... 382/232; 382/166; 382/230; 708/204; 708/203

(58) Field of Classification Search
USPC ......... 382/244, 232, 233, 266, 239, 176, 260, 382/300, 302, 303; 708/501, 603, 495, 490, 708/204, 203; 375/240.26, 240.13, 240.16; 719/382, 318, 315
See application file for complete search history.

(56) References Cited

U.S. PATENT DOCUMENTS

| | | | | |
|---|---|---|---|---|
| 4,603,323 | A * | 7/1986 | Hassitt et al. | 341/75 |
| 5,161,117 | A * | 11/1992 | Waggener, Jr. | 708/204 |
| 6,253,222 | B1 * | 6/2001 | Dyer et al. | 708/203 |
| 6,285,779 | B1 * | 9/2001 | Lapidous et al. | 382/106 |
| 6,768,495 | B2 * | 7/2004 | Valente | 345/619 |
| 6,873,324 | B2 * | 3/2005 | Saito et al. | 345/419 |
| 7,792,390 | B2 * | 9/2010 | Prakash et al. | 382/302 |
| 7,899,855 | B2 * | 3/2011 | Ramanujam | 708/204 |
| 2006/0071825 | A1* | 4/2006 | Demos | 341/50 |
| 2007/0160305 | A1* | 7/2007 | Demos | 382/244 |

FOREIGN PATENT DOCUMENTS

| | | | | | |
|---|---|---|---|---|---|
| JP | 359095647 | A | * | 6/1984 | G06F 7/00 |
| JP | 359095647 | A | * | 6/1984 | G06F 7/00 |

OTHER PUBLICATIONS

Pavle Belanovic "Library of parameterized Hardware Models for Floating point Arithmetic with an example Application", MS thesis, published on May 2002, pp. 6, 9-13 and 25-28.*
Patrick Longa, An optimized architecture for 2D discrete wavelet transform on FPGAs using distribution arithmetic, published 2006, pp. 14.*
Munkberg, et al. "High dynamic range texture compression for graphics hardware", ACM Transactions on Graphics (TOG), vol. 25 Issue 3, Jul. 2006, 9 pages.
K. Roimela, et al. "High Dynamic Range Texture Compression" Proceedings of SIGGRAPH 2006, 6 pages.
Martina, Maurizio, et al., "Novel JPEG 2000 Compliant DWT and IWT VLSI Implementations," Journal of VLSI Signal Processing, vol. 34, 2003, 137-153.

* cited by examiner

*Primary Examiner* — Mekonen Bekele
(74) *Attorney, Agent, or Firm* — Kilpatrick Townsend & Stockton LLP

(57) ABSTRACT

A computer-implemented method includes dividing an image into one or more image channels for image compression. The method also includes dividing one or more of the image channels into one or more blocks. At least one of the blocks includes floating point representations of pixel values included in the block. The method also includes converting the floating point representations of pixel values into integer representations such that the sign of each floating point representation is preserved. The method also includes storing the difference of adjacent integer representations as a compressed version of the image.

25 Claims, 11 Drawing Sheets h[ ]  (400)

| h[0] | h[1] | h[2] | h[3] |
|---|---|---|---|
| h[4] | h[5] | h[6] | h[7] |
| h[8] | h[9] | h[10] | h[11] |
| h[12] | h[13] | h[14] | h[15] | h[ ] : Floating-point  (402)

| -1.000 | 0.000 | 0.000 | 1.000 |
|---|---|---|---|
| 0.000 | 1.100 | 1.550 | 1.500 |
| 1.100 | 1.000 | 1.500 | 1.000 |
| 1.150 | 0.100 | 1.050 | 1.050 | h[ ] : binary  (404)

| 1011111000000000 | 0000000000000000 | 0000000000000000 | 0011111000000000 |
|---|---|---|---|
| 0000000000000000 | 0011110001100110 | 0011111000110011 | 0011111000000000 |
| 0011110001100110 | 0011110000000000 | 0011111000000000 | 0011110000000000 |
| 0011110010011010 | 0011100000110011 | 0011110000110011 | 0011110000110011 |

FIG. 4

| bytes | 7 | 6 | 5 | 4 | 3 | 2 | 1 | 0 |
|---|---|---|---|---|---|---|---|---|
| 0 | | | | (t[0] ÷ e)[15-8] | | | | |
| 1 | | | | (t[0] ÷ e)[7-0] | | | | |
| 2 | | | s[5-0] | | | | r[0][5-4] | |
| 3 | r[1][1-0] | | r[0][3-0] | | | r[1][5-2] | | |
| 4 | | | | r[2][5-0] | | | r[4][5-4] | |
| 5 | r[5][1-0] | | r[4][3-0] | | | r[3][5-0] | | |
| 6 | | | | r[6][5-0] | | | r[8][5-4] | |
| 7 | r[9][1-0] | | r[8][3-0] | | | r[7][5-0] | | |
| 8 | | | | r[10][5-0] | | | r[12][5-4] | |
| 9 | r[13][1-0] | | r[12][3-0] | | | r[11][5-0] | | |
| 10 | | | | r[14][5-0] | | | | |
| 11 | | | | | | | | |
| 12 | | | | | | | | |
| 13 | | | | | | | | |

| | Binary 702 | Hex 704 |
|---|---|---|
| 0 | 01000100 | 0x44 |
| 1 | 00110011 | 0x33 |
| 2 | 00100111 | 0x27 |
| 3 | 11101111 | 0xef |
| 4 | 10100000 | 0xa0 |
| 5 | 11111011 | 0xfb |
| 6 | 11101000 | 0xe8 |
| 7 | 00011001 | 0x19 |
| 8 | 11111110 | 0xfe |
| 9 | 00011000 | 0x18 |
| 10 | 00100111 | 0x27 |
| 11 | 01111110 | 0x7e |
| 12 | 00001000 | 0x08 |
| 13 | 00100000 | 0x20 |

FIG. 7

IMAGE COMPRESSION AND DECOMPRESSION

TECHNICAL FIELD

This document relates to compressing and decompressing images for various image formats.

BACKGROUND

With the ever increasing demand for exchanging information, efficiently providing digital content such as still images or video to various types of systems and devices is desirable. One or more techniques and methodologies may be implemented to efficiently store and exchange such content. For example, content may be stored in files, and later segmented and inserted into packets for transmission to one or more systems and devices. The content may also be segmented and inserted into packets for near real-time transmission to systems and devices. To improve storage and transmission efficiency, the amount of digital content to be stored or transmitted may be reduced by compressing the content such that a significant amount of the original image quality is retained upon being decompressed.

SUMMARY

The systems and techniques described here relate to compressing and decompressing images in high-dynamic range formats.

In one aspect, a computer-implemented method includes dividing an image into one or more image channels for image compression. The method also includes dividing one or more of the image channels into one or more blocks. At least one of the blocks includes floating point representations of pixel values included in the block. The method also includes converting the floating point representations of pixel values into integer representations such that the sign of each floating point representation is preserved. The method also includes storing the difference of adjacent integer representations as a compressed version of the image.

Implementations may include any or all of the following features. The computer-implemented method may further include storing an integer representation of a first pixel value of one or more blocks. The method may include additional operations such as storing an integer representative of a number of shift operations and calculating an offset representative of compression error. Once calculated, the method may also include applying the offset to one pixel value of a block prior to storing the pixel value. The offset calculation may also include selecting a pixel value included in one block and calculating the offset may include determining the difference of the selected pixel and a reconstructed version of the pixel. Dividing the image channel into one or more blocks may include determining if the image channel is evenly divisible. If not evenly divisible, the method may include padding the block such that the block is evenly divisible.

In another aspect, a computer-implemented method includes receiving integers representative of the difference of adjacent pixels of a first block of a first image channel. The integers preserve the sign of associated floating point representations. The method also includes converting the integers into the floating point representations of pixel values of the first block and combining the floating point representations of the first block and corresponding floating point representations of a second block to produce the first image channel. The method further includes combining the first image channel with at least a second image channel for reconstructing a compressed image.

In another aspect, a system includes an image compressor to divide an image into one or more image channels for image compression. The image compressor is configured to divide one or more of the image channels into at least one block. At least one block includes floating point representations of pixel values included in the block. The image compressor is further configured to convert the floating point representations of pixel values into integer representations such that the sign of each floating point representation is preserved. The image compressor is also configured to store the difference of adjacent integer representations as a compressed version of the image.

In another aspect, a system includes an image restorer to receive integers representative of the difference of adjacent pixels of a block of a first image channel. The integers preserve the sign of associated floating point representations. The image restorer is configured to convert the integers into floating point representations of pixel values of the block. The image restorer is further configured to combine the floating point representations of the block with floating point representations of another block to produce the first image channel. The image restorer is also configured to combine first image channel with at least a second image channel for reconstructing a compressed image.

In still another aspect, a computer program product tangibly embodied in an information carrier includes instructions that when executed by a processor perform a method that includes dividing an image into one or more image channels for image compression. The method of also includes dividing at least one of the image channels into one or more blocks. At least one block includes floating point representations of pixel values included in the block. The method also includes converting the floating point representations of pixel values into integer representations such that the sign of each floating point representation is preserved. The method also includes storing the difference of adjacent integer representations as a compressed version of the image.

Details of one or more implementations are set forth in the accompanying drawings and the description below. Other features, aspects and advantages will be apparent from the description and drawings, and from the claims.

DESCRIPTION OF DRAWINGS

FIG. 4-6 illustrates processing to compress an image.
FIG. 7 illustrates compressed image data stored in a file.

Like reference symbols in the various drawings indicate like elements.

DETAILED DESCRIPTION

Figure 1:
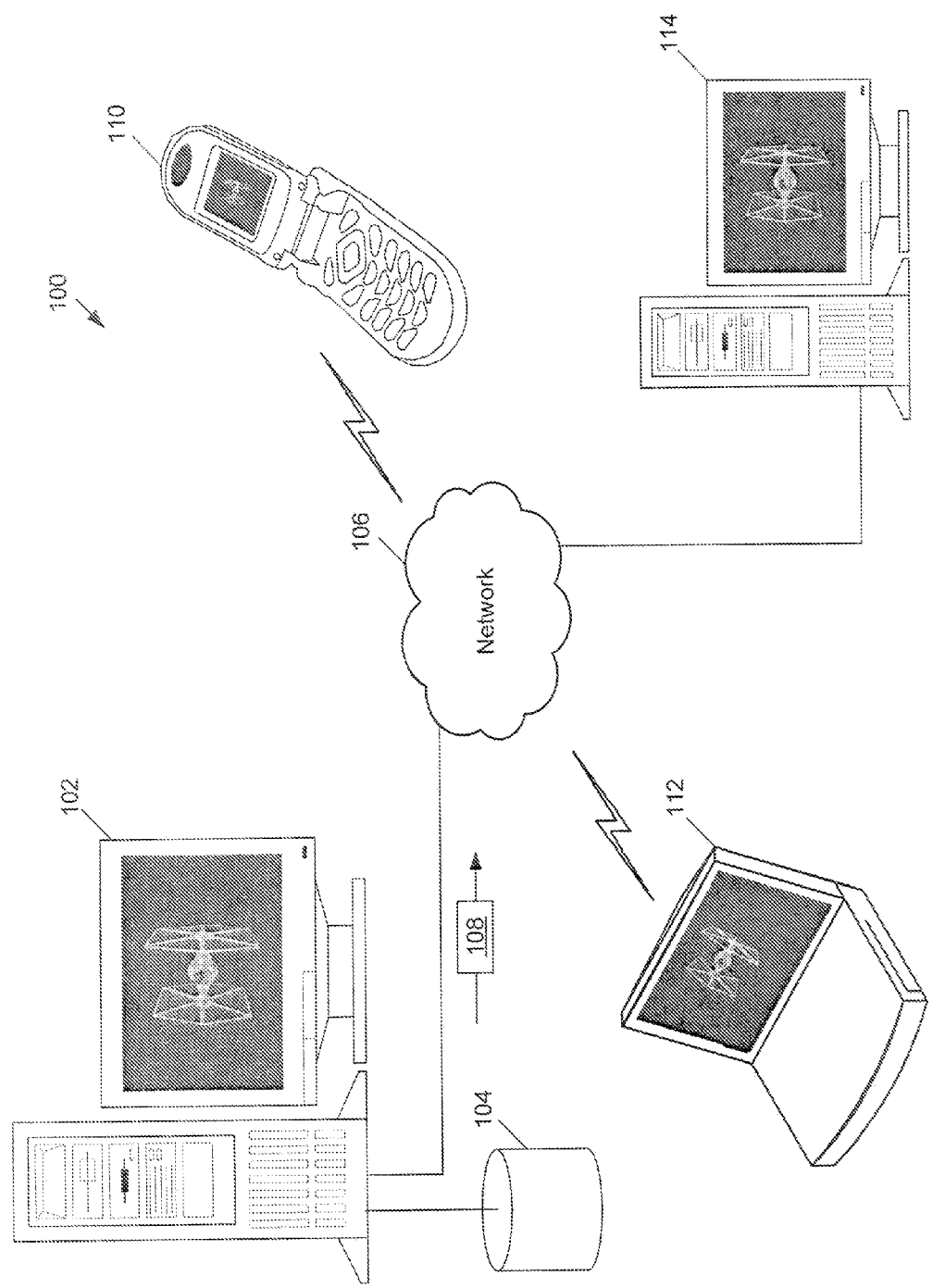
FIG. 1 illustrates a system for transmitting image content.

Referring to FIG. 1, a communication system 100 includes a variety of devices and components for exchanging and presenting digital content such as digital still images or video images. For example, a computer system 102 may store one or more digital still or video images (e.g., a movie, album of photographs, etc.) that may be presented by the computer system and provided to other computing devices (e.g., computer systems, personal digital assistants, etc.) for presentation and possibly being further processed. Often the still and video images are stored in a storage device for later retrieval and presentation or transmission. For example, in this particular illustration, the image being presented by the computer system 102 is stored in a storage device 104 and may be retrieved upon a local request (from the computer system 102) or a request from a remote computing device (via a network 106). Prior to being stored, the image is inserted into a file and compressed for efficient storage. Upon retrieval from the storage device 104, the compressed image may be decompressed and presented by the computer system 102, transmitted though the network 106 (e.g., the Internet) to another computing device (e.g., the requesting computing device) by way of wireless and hardwire connections, or further processed, for example. For transmission, the compressed image is inserted into one or more data packets (illustrated here by a single data packet 108) that are provided to the network 106 for distribution to wireless devices such as a cellular telephone 110 and a laptop computer 112 (capable of wireless communication) and a hardwired device (e.g., another computer system 114).

While illustrating the transmission of a single compressed still image in a single data packet 108, multiple images such as a series of images (e.g., that represent a movie) may be compressed and stored in the storage device 104 for later retrieval and processing (e.g., inserted into one or more data packets for transmission). Upon being received, the compressed images may be accessed for presentation or stored on one or more devices (for presenting at a later time). Storage devices, such as storage device 104 may be implemented as hard drives, CD-ROMs and the like. Storage devices may also store information by implementing memory such as random access memory (RAM), dynamic RAM (DRAM), static RAM (SRAM) and other types of volatile and non-volatile memory. Furthermore, along with being used individually, two or more types of storage devices may be used in combination.

Prior to compressing one or more image for storage, images are often placed into a common format that defines the image characteristics and organizes image content. Along with industry standards, some formats may be considered proprietary for particular applications, companies, or industries. With time, these proprietary formats may become one or more industry standards. For example, a high dynamic range imaging file format such as OpenEXR, produced by Industrial Light & Magic (ILM) of San Francisco, Calif., may be used for formatting various type of images and image sequences. In general, OpenEXR supports sixteen bits-per-channel floating point values (e.g., one sign bit, a five-bit exponent and a ten-bit mantissa representation), thereby providing considerable dynamic range. Since the OpenEXR file format is often used for storing video segments, the content of such files is often accessed for real-time playback (or near real-time playback). For example, the video content may be associated with a video game that may allow for considerably small content access time delays. As such, by providing the ability to compress and decompress OpenEXR files, high-dynamic range image content may be stored and accessed e.g., for near real-time playback. Along with compressing and decompressing OpenEXR formatted files, other types of high-dynamic range image files may be produced and accessed for content retrieval.

Figure 2:
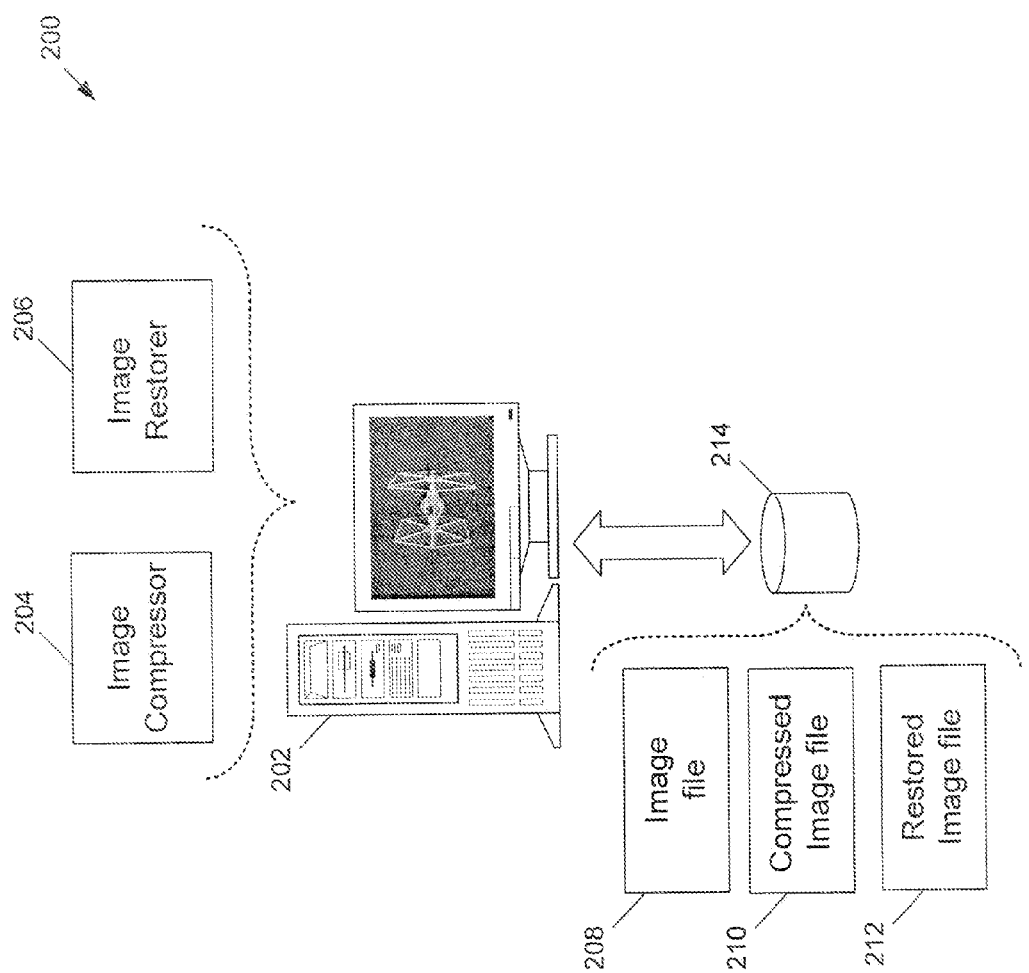
FIG. 2 is a diagram of an image compression system.

Referring to FIG. 2, an image compression system 200 includes the functionality for compressing high-dynamic range image files that use formats such as OpenEXR. Furthermore, the system 200 provides the functionality for accessing the compressed content for real-time presentation. In this particular implementation, a computer system 202 includes an image compressor 204 capable of compressing image files with high dynamic range formats (e.g., OpenEXR) that may be relatively quickly accessed by an image restorer 206. For example, a high dynamic range image file 208, which complies to a format such as OpenEXR may be compressed by the image compressor 204 into a compressed image file 210. To access the stored image content, the image restorer 206 may process the compressed image file 210 to produce a restored image file 212. In this particular arrangement, the image compressor 204 and the image restorer 206 are two distinct processes, however, in other arrangements, functionality of the two processes may be combined into a single process or distributed among three or more processes. Also, in this implementation the image compressor 204 and the image restorer 206 are stored in memory (not shown) of the computer system 202 (e.g., RAM, SRAM, DRAM, etc.), however the processes (e.g., programs) may also be stored in a storage device 214 (e.g., hard drive, CD-ROM, RAID, etc.). In this instance, the image file 208, the compressed image file 210 and the restored image file 212 are stored in the storage device 214, however, one or more of the files may be stored in another device, which may serve as one or more files sources.

Figure 3:
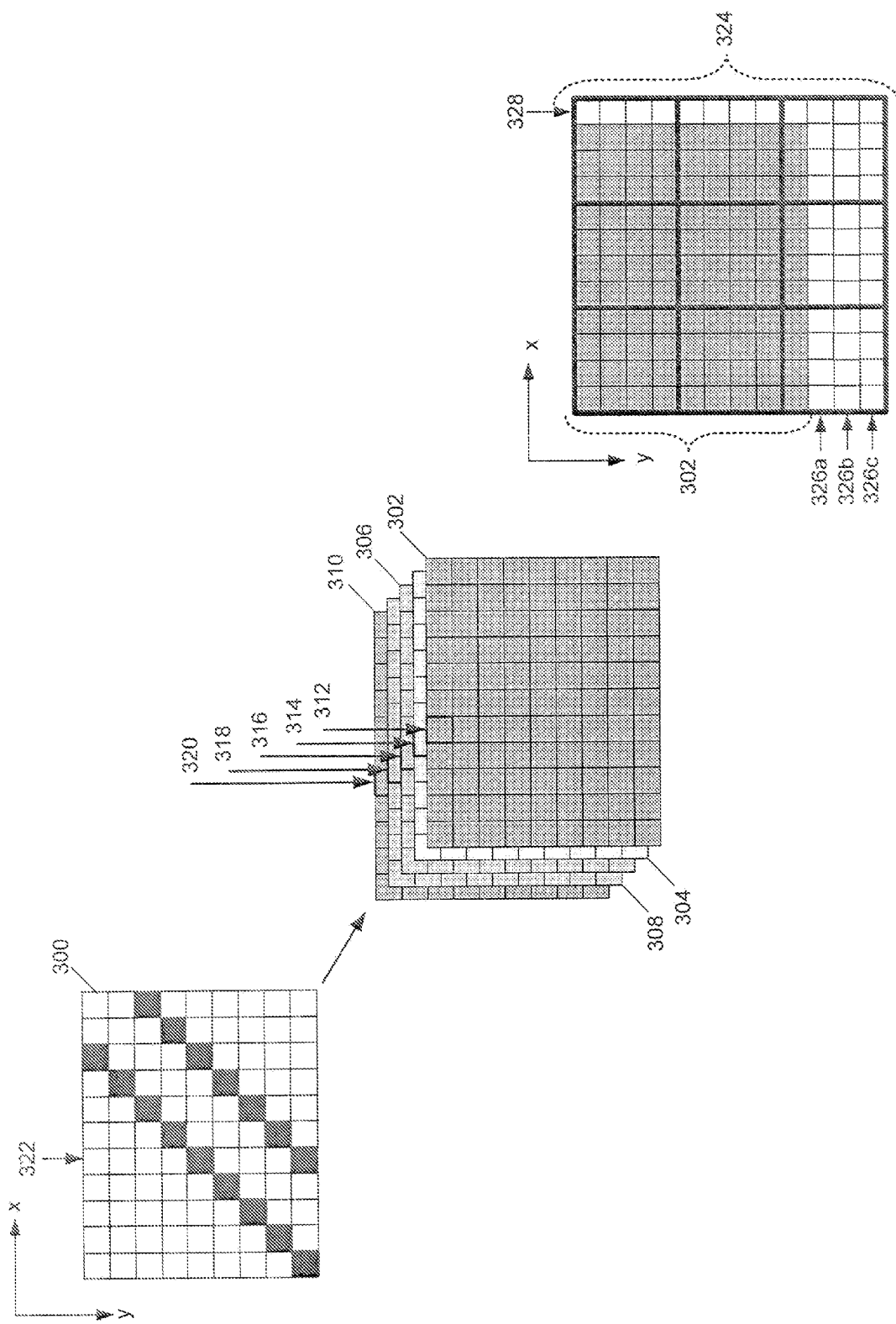
FIG. 3 illustrates segments of an image.

Referring to FIG. 3, operations of the image compressor 204 are illustrated for compressing a high-dynamic range image file such as an OpenEXR file. For ease of illustration, an image 300 is shown that includes ninety-nine pixels in a grid pattern with eleven pixels along the x-axis and nine pixels along the y-axis. The content of the image corresponds to a small portion of the image shown in FIG. 1 and FIG. 2. While images typically include orders of magnitude more pixels (e.g., $4 \times 10^6$, $20 \times 10^6$ pixels), the ninety-nine pixels of the image 300 allow for illustrating operations on a reasonable scale.

High-dynamic range image files such as an OpenEXR image file may be represented with multiple sets of data (referred to as image channels) that represent different content of the pixels included in the image file. By distributing image content across channels, individual channel characteristics (e.g., intensity level) may be adjusted along with characteristics of multiple channels (e.g., image level adjustments). For example, image 300 may be separated into five image channels 302, 304, 306, 308, 310, however, although fewer or more image channels may be used for image file representation. In this example, image channel 302 includes pixels values (e.g., 16-bit floating-point numbers) that represent the intensity of the color red present in the corresponding pixel. Similarly, image channel 304 includes pixels values for the intensity of the color green and image channel 306 includes pixel values for the intensity of the color blue. Along with color information, other pixel level information may also be represented with one or more image channels. For example, image channel 308 includes pixel-level information associated with transparency (referred to as the alpha channel) and image channel 310 that includes pixel information associated with distance from the camera (referred to as the depth channel) that captured the image. Other types of channels may also be used to represent image files, for example, channels associated with specular and diffuse reflections, surface normals, and various other types of information.

In this implementation each channel is represented as a rectangular grid of elements that represent pixel values associated with the channel. For example, element 312 has a value that represents the level of the color red of the pixel in the image 300. In this example, each element value is represented as a binary 16-bit floating-point number, however other numerical representations may also be utilized. Similarly, elements 314, 316, 318 and 320 respective represent the level of green, blue, alpha and depth of a particular pixel 322 of the image 300. Each rectangular grid of each channel includes an equivalent number of elements, for example, each grid is defined by eleven elements along the x-axis and nine elements along the y-axis. However, different grid sizes and shapes may be used to define the channels. For example, rather than each channel having an equivalent grid size, one or more channels may be represented with grids with fewer or more pixel elements.

In this implementation, the image compressor 204 separates the image 300 into channels and processes each channel by segmenting each representative channel into a grid of blocks, which each typically have equivalent dimension along the x and y axis, and processes each block. For example, each channel may be segmented onto blocks, in which each block is defined by four elements along the x axis and four elements along the y axis. However, for some grids, the number of elements of each channel along the x and y axis may not be evenly divisible by the block size and may need to be expanded to provide a proper number of pixel elements. For example, for four-by-four element blocks, the number of grid elements along the x axis and the number of elements along the y axis need to be evenly divisible by four. As illustrated by the blocks 324, since channel 302 includes only eleven by nine elements, the grid needs to be expanded by adding three element rows 326a,b,c along the x axis and one element column 328 along the y axis. Various techniques and methodologies may be implemented to assign pixel values to the elements of the expanded rows 326a,b,c and column 328. For example, the added elements (for padding) may be assigned the same pixel value or some of the added elements may be assigned different pixel values. Typically, each added element is assigned a pixel value that is present in the respective block to which the element has been added. For example, a pixel value of particular element location (e.g., upper left most element, lower right most element, etc.) may be assigned to each added element. One or more mathematical operations may also executed to identify pixel value assignments, for example, pixel values that are already present in the block may be averaged to determine the pixel value to be assigned to each added element. In this example, each element of the channel 302 is represented as a 16-bit floating-point number. The added elements of rows 326 a,b,c and column 328 are assigned the pixel value of the upper left most element of the corresponding block (to which the row or column element is added).

Each bock contains sixteen 16-bit floating point numbers, or 32 bytes, and the image compressor 204 may compact the 32 bytes of the blocks 324 into 14 bytes, thereby providing a moderate compression ratio of 32:14, or approximately 2.28:1.

Referring to FIG. 4, one representative channel block 400 (of the nine blocks 324 shown in FIG. 3) is illustrated and includes four elements along the x axis and four elements along the y axis. Each element is respectively labeled h[0], h[1], h[2], . . . , h[15] to represent the values associated with the block locations. Each of the h[ ] values is represented with a 16-bit floating point value, however, one or more other numerical representations may be used.

As an illustrative example, a channel block 402 is provided with exemplary floating point numbers that represent corresponding values h[0], h[1], h[2], . . . , h[15] of the channel block 400. The numerical value of each floating point number is represented with a group of sixteen binary values (referred to as bits). The sixteen-bit groups that correspond to each of the h[ ] values in the channel block 402 are illustrated in a channel block 404. Each sixteen-bit group includes, from left to right, a one-bit sign, a five-bit exponent and a ten-bit mantissa.

Figure 5:
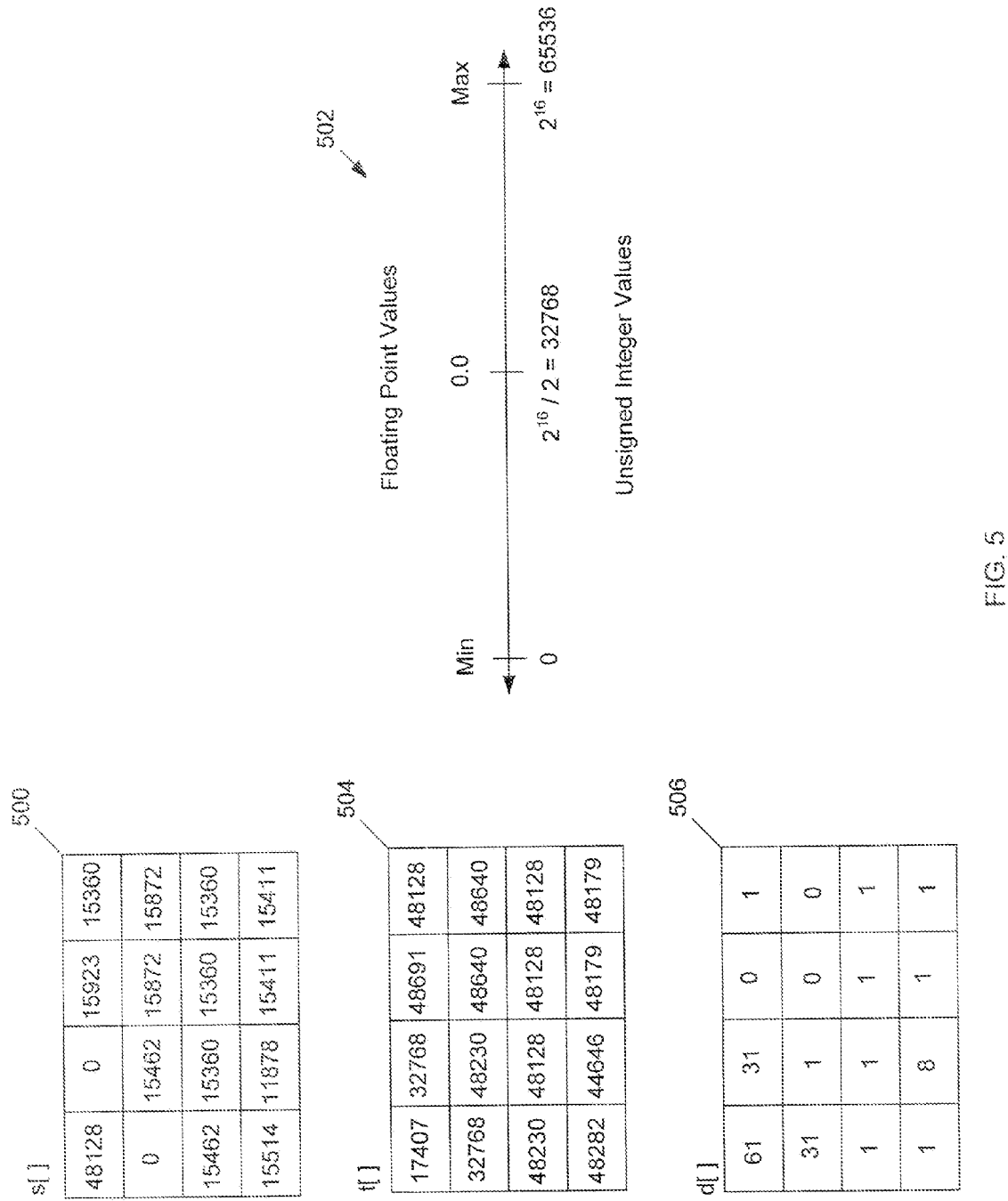

Referring to FIG. 5, and continuing with the compression technique provided by the image compressor 204 (shown in FIG. 2), channel block floating point representations are converted into integer representations. In particular, each sixteen-bit group can be interpreted as an unsigned integer with a value between 0 and 65535 (i.e., $2^{16}-1$). For example, the floating-point number 1.5 may be represented with the sixteen-bit group 0011111000000. Interpreting this group as an unsigned integer produces the value 15872.

Returning to the channel block 404, the sixteen-bit groups, which each represent a corresponding sixteen-bit floating-point number h[ ], are interpreted by the image compressor 204 as unsigned integer values s[0], s[1], . . . , s[15], and thereby providing a channel block 500.

Since the leftmost bit of each sixteen-bit group represents the sign of the corresponding floating-point number (i.e., "1" for negative numbers, "0" for positive numbers), the integer values s[ ] do not track monotonically with respect to the floating-point values h[ ]. As such, for each h[i] value greater than h[j] (i.e., h[i]>h[j]), the corresponding value of s[i] does not necessarily have to be greater than s[j] (i.e., s[i]>s[j]). For example, a negative floating point value (e.g., h[0]=−1.000) within the channel block 402 is interpreted as having a relatively large integer values (e.g., s[0]=48128) compared to the interpretation of a positive floating point value (e.g., h[3]=1.000) of the channel block 402 as an unsigned integer value (e.g., s[3]=15360).

The compression technique utilized by the image compressor 204 computes differences between integer pixel values (e.g., d[ ] and r[ ], described below). To preserve image quality, the computed differences should approximate the perceptual differences between the corresponding floating-point values. By monitoring the sign bit of each floating point number and appropriately scaling the integer values, the integer values can monotonically track the floating point values. For example, zero floating-point values (or non-infinite floating point values) may be assigned an integer value that represents the midpoint of the sixteen-bit domain (e.g., $2^{16}/2=32768$). Positive floating-point values are mapped to corresponding unsigned integer values between the midpoint value (e.g., 32768) and the maximum unsigned integer that may be represented with sixteen bits (e.g., $2^{16}-1=65535$). Negative floating-point values are mapped to corresponding range of integer values between 0 and the midpoint value (e.g., 32768). Such a conversion is illustrated with a scale 502.

The image compressor 204 may perform various types of operations to interpret the floating point numbers onto an appropriate integer scale. For example, the following C++ code may be used to provide the scaled unsigned integers t[ ] from the integer equivalence s[ ] of the binary representation of floating point numbers h[ ]:

---

```
if (s[i] & 0x7c00) == 0x7c00)
    t[i] = 0x8000;
else if (s[i] & 0x8000)
    t[i] = ~s[i];
else
    t[i] = s[i] | 0x8000;
```
such that, using the C++ code, t[0] ... t[15] comply to:

-continued

| t[i] > t[j] | if h[i] > h[j], and h[i] and h[j] are finite |
| t[i] = 32768 | if h[i] = 0 or h[i] is not finite |

Thus, a channel block 504 may be produced that accounts for the sign bits by applying the scale 502 to binary values of from the channel block 404 (whose decimal equivalent values are represented in the channel block 500).

Operations of the image compressor 204 also include determining the maximum value included in the channel block 504 and determining the difference of adjacent channel block values. In general, by retaining the maximum value and values that represent the differences of adjacent block elements, each of the channel block representations 504, 500, 404 and 402 may be reproduced from this information.

The channel block 504 values t[ ] are adjusted such that the calculated differences (between the t[ ] values) are contained within a particular range. In a binary representation, such an operation may be considered a bitwise shift operation. For example, the channel block 504 values t[ ] values may be adjusted such that the calculated differences range between decimal 0 and decimal 63. One or more techniques may be implemented to adjust the channel block 504 to achieve such a range. For example, the difference between each t[ ] value and the maximum t[ ] value may be computed, divided by a factor $2^s$ and rounded to the nearest integer to produce corresponding values d[ ], which may be represented as:

$$d[i] = \text{Round to Nearest Integer}((\text{Maximum}(t[\ ]) - t[i])/2^s); \quad (1)$$

in which "s" is the smallest integer such that the values of r[i] (defined below) fall in a range between 0 and 63:

$$0 \leq r[i] \leq 63 \text{ for } i = 0 \ldots 14. \quad (2)$$

Returning to the example, a channel block 506 represents values of d[ ], in which s=9 and the maximum value included in the channel block 504 is t[2]=48691.

Figure 6:
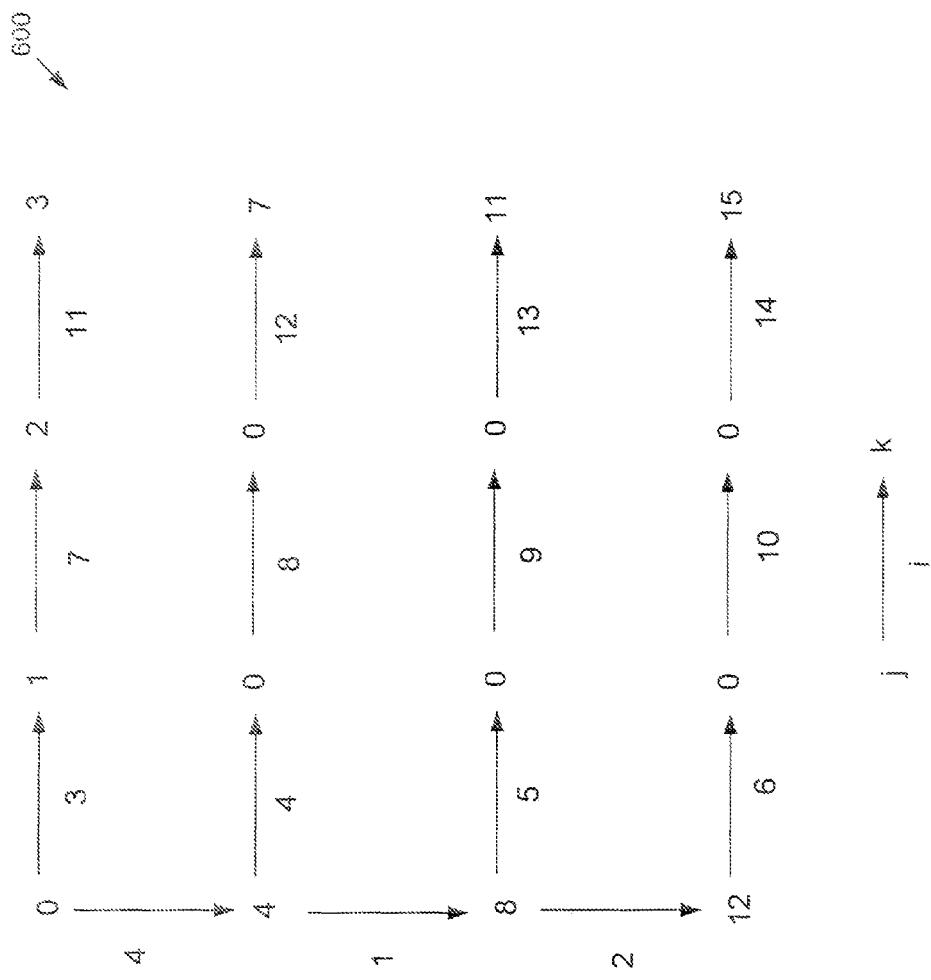

Referring to FIG. 6, various methodologies and techniques may be implemented for computing the difference among adjacent d[ ] values included in the channel block 506. For example, differences between horizontally and vertically adjacent d[ ] values may be computed according to a graphical representation 600 using the channel block 506 values to determine the r[ ] values. The notation used in the chart:

$$j \underset{i}{\rightarrow} k \quad (3)$$

corresponds to the expression:

$$r[i] = d[j] - d[k] + 32; \quad (4)$$

in which "s" is chosen (in equation (1)) such that the integer values r[ ] are within the range of integer values between 0 and 63, thereby allowing each r[ ] value to be encoded within six bits. For this example, the following values of r[ ] are computed and have the corresponding six bit binary equivalence:

r[0]=62=111110;
r[1]=62=111110;
r[2]=32=100000;
r[3]=62=111110;
r[4]=62=111110;
r[5]=32=100000;
r[6]=25=011001;
r[7]=63=111111;
r[8]=33=100001;
r[9]=32=100000;
r[10]=39=100111;
r[11]=31=011111;
r[12]=32=100000;
r[13]=32=100000; and
r[14]=32=100000.

Each r[ ] value generally represents the approximate perceptual difference between a pair of adjacent pixels (included in a channel block). Since each channel block is defined as a group of four-by-four pixels, the block represents a relatively small area compared to the area of a displayed image. The human visual system generally perceives the aggregate color and brightness provided by the channel block and the presence or absence of differences between the adjacent pixels. However, the human visual system is less sensitive to the exact magnitude of the differences. By providing an approximate representation of pixel differences and a more accurate representation of the aggregate color and brightness, the human visual system typically responds in a similar manner (compared to providing a nearly exact representation of aggregate and differential pixel values). Thus, by allowing pixel differences to be approximate, a channel block of four by four pixels may be compressed by storing one pixel value (e.g., the maximum pixel value, referred to as maximum(t[ ])) with relatively high precision and fifteen pixel difference values at a lower precision. However, while visual perception may be nearly equivalent, some color and brightness information may be lost when decompressing a channel block for reconstructing an image.

In some implementations, the image compressor 204 may provide additional processing to reduce the amount of color and brightness information lost during compression. For example, the image compressor 204 may check information associated with the brightest channel block pixel (e.g., maximum t[ ]) prior to compression and post-compression. By comparing the brightness of a pixel prior to compression with the brightness of the pixel after reconstruction, a correction factor may be calculated and used to reduce losses due to compression. By adjusting the original pixel value to account for the correction factor, the effects of compression may be reduced. For example, a correction factor "e" may be calculated as:

$$e = \text{Maximum}(t[\ ]) - (d[0] \times 2^s) - t[0] \quad (5)$$

in which the decompressed pixel value is represented by the quantity $\text{Maximum}(t[\ ]) - (d[0] \times 2^s)$, and t[0] represents the pixel value prior to compression. By storing a value of t[0]+e rather than a value of t[0] (the maximum of the original sixteen pixel values of h[ ]), decompressing may yield a block of pixel values that are more similar to the original pixel values. Returning to the example above, the value of "e" is computed to be $e = 48691 - (61 \times 2^9) - 17407 = 52$.

Referring to FIG. 7, upon computing the maximum pixel value and the pixel difference values, the information may be stored into a file such as the compressed image file 210 (shown in FIG. 2) for storage and later retrieval for image reconstruction. For example, a fourteen-byte block of memory 700 is illustrated as storing the values t[0]+e, s, r[0], r[1], . . . , r[14]. In this exemplary layout, the sixteen-bit t[0]÷e value is stored in the first two bytes (byte 0 and 1) of the memory block 700. The bits are ordered from right to left, starting with 0. For example, the "0" in the value x=1011 is bit number 2, and x[2-0] denotes the rightmost three bits of x, or "011". As such, the first eight bits (e.g., bits 0-7) of the value t[0]+e are stored in the second byte (e.g., byte 1) while the second eight bits (e.g., bits 8-15) of the value are stored in the first byte (e.g., byte 0). Following that value, the six bits that represent "s" and each six bits that represent each difference value r[i] (i=1 to 14) are stored in bytes 2 through byte 13 of the fourteen-byte memory block 700.

Returning to the example, the value of t[0]+e=17459 and may be represented by a sixteen-bit binary equivalence of 0100010000110011 and is represented in a block of memory 702 along with the six-bit representations of the value of s (e.g., s=9=001001) and the difference values r[0], r[1], . . . r[13]. Similar to the memory block 700, the six-bit numbers may map across adjacent bytes of memory. A hexadecimal representation is also provided in a corresponding block of memory 704.

Memory blocks that store information associated with different channel blocks may also be combined to produce, for example, a file such as the compressed image file 210. For example, fourteen-byte memory blocks of channel blocks associated with an image may be concatenated to produce a file. Along with channel block information, the compressed image files may also include other information such as header data and data to facilitate access to portions of the file.

Once the image data is compressed and inserted into a file (e.g., compressed image file 210), the file may be accessed for data retrieval and image reconstruction by the image restorer 206. In general, decompressing a compressed file such as the compressed file 210 involves approximately reversing some of the executed compression operations. In one example, decompression operations may be executable operations of a function or subroutine. Such a function (e.g., written as a C++ function) may expand a compressed 14-byte block, b[0] . . . b[13] into sixteen 16-bit values, s[0] . . . s[15] that are re-interpreted to produce the sixteen-bit floating-point numbers of an uncompressed channel block. For example, a C++ function may take the form:

```
void
unpack14 (const unsigned char b[14], unsigned short s[16])
{
  s[0] = (b[0] << 8) | b[1];
  unsigned short shift = (b[2] >> 2);
  unsigned short bias = (0x20 << shift);
  s[ 4] = s[ 0] + ((((b[ 2] <<4) | (b[ 3] >> 4)) & 0x3f) << shift) – bias;
  s[ 8] = s[ 4] + ((((b[ 3] <<2) | (b[ 4] >> 6)) & 0x3f) << shift) – bias;
  s[ 12] = s[ 8] + ((b[ 4] & 0x3f) << shift) – bias;
  s[1] = s[ 0] + ((b[ 5]>> 2) << shift) – bias;
  s[5] = s[ 4] + ((((b[ 5] << 4) | (b[ 6] >> 4)) & 0x3f) << shift) – bias;
  s[9] = s[ 8] + ((((b[ 6] << 2) | (b[ 7] >> 6)) & 0x3f) << shift) – bias;
  s[13] = s[12] + ((b[7] & 0x3f) << shift) – bias;
  s[ 2] = s[ 1] + ((b[ 8] >> 2) << shift) – bias;
  s[ 6] = s[ 5] + ((((b[ 8] << 4) | (b[ 9] >> 4)) & 0x3f) << shift) – bias;
  s[10] = s[ 9] + ((((b[ 9] <<2) | (b[10] >> 6)) & 0x3f) << shift) – bias;
  s[14] = s[13] + ((b[10] & 0x3f) << shift) – bias;
  s[ 3] = s[ 2] + ((b[11] >> 2) << shift) – bias;
  s[ 7] = s[ 6] + ((((b[11] << 4) | (b[12] >>4)) & 0x3f) << shift) – bias;
  s[11] = s[10] + ((((b[12] << 2) | (b[13] >> 6)) & 0x3f) << shift) – bias;
  s[15] = s[14] + ((b[13] & 0x3f) << shift) – bias;
  for (int i = 0; i < 16; ++i)
  {
    if (s[i] & 0x8000)
      s[i] &= 0x7fff;
    else
      s[i] = ~s[i];
  }
}
```

By using such a function, the compressed channel block represented in the memory block 702 (or the memory block 704 represented in hexadecimal) may be decompressed into 16-bit floating point values:

| | | | |
|---|---|---|---|
| −0.975 | 0.000 | 1.550 | 1.050 |
| 0.000 | 1.050 | 1.550 | 1.550 |
| 1.050 | 1.050 | 1.050 | 1.050 |
| 1.050 | 0.097 | 1.050 | 1.050. |

Comparing the decompressed floating point numbers to the pre-compressed floating point numbers (shown in channel block 402 of FIG. 4), compression error may be calculated by computing the difference between the pre-compressed values and the decompressed values. For this example, compression error is:

| | | | |
|---|---|---|---|
| −0.025 | −0.000 | 0.000 | −0.050 |
| −0.000 | 0.050 | −0.050 | −0.050 |
| 0.050 | −0.050 | −0.050 | −0.050 |
| 0.101 | 0.003 | 0.000 | 0.000. |

Thus, while small differences are present in some values, the recovered maximum value (i.e., 1.550) is equal to the pre-compressed maximum value. As such, the maximum brightness of the channel block, to which the human eye is sensitive, is recovered. Some slight differences of the channel block values, to which the eye is also sensitive, are also detected. However, human perception is generally insensitive to the severity of these differences. So if pre-compressed and decompressed pixel values are approximately equivalent while the overall color and brightness are maintained, a reasonable approximation is provided by the decompressed four-by-four pixel block.

Along with retaining the maximum value, while allowing for slight pixel value differences to be acceptable, the image compressor 204 and image restorer 206 may also implement other features for image compression and reconstruction. For example, some images may contain relatively large fields of pixels with identical values. Such fields, referred to as flat fields, may include a number of channel blocks that each contain identical pixels. If such a channel block with sixteen identical pixel values is detected, a reduced amount of data, which is smaller than fourteen bytes, may be stored to represent the channel block. For example, three bytes of data may be stored to represent such a channel block by storing the sixteen-bit t[0] value in the first two bytes. The third byte may contain a value defined to alert the image restorer 206 that the three bytes represent a flat field. To provide such an alert, the third byte may include a number that represents a shift value that is not attainable for a fourteen byte block. For example, the third byte may contain the value 0xfc (bit pattern 11111100), which corresponds to s=63, a value that cannot occur in a regular 14-byte block. Other techniques and methodologies may also be implemented to provide a flat field alert to the image restorer 206.

Figure 8:
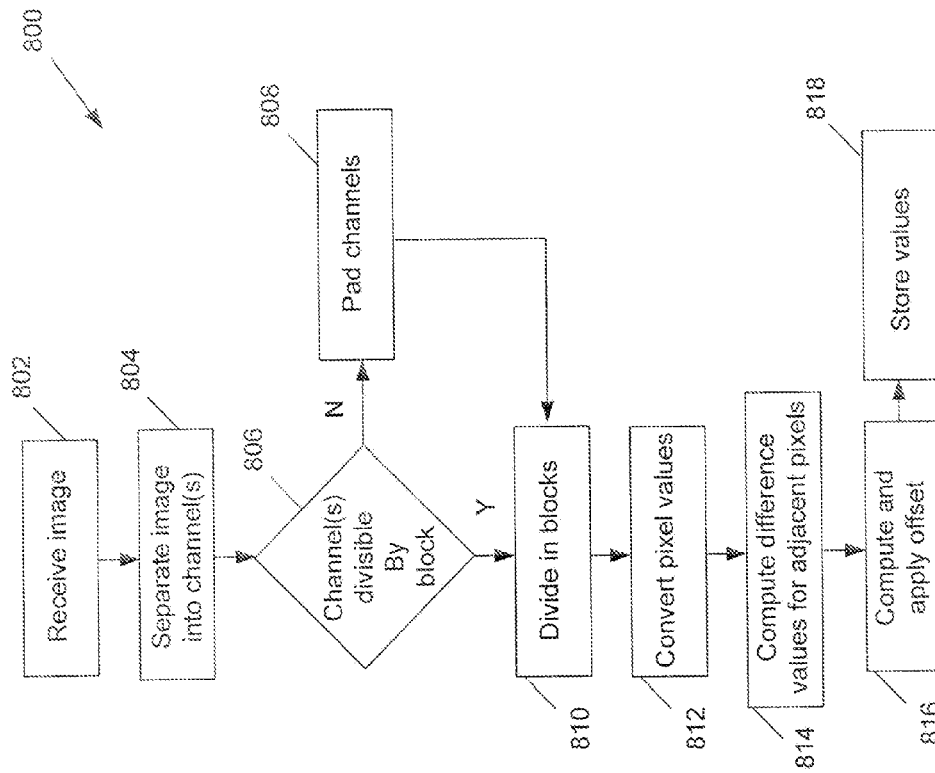
FIGS. 8 and 10 are flowcharts of operations of an image compressor.

Referring to FIG. 8, a flowchart 800 represents a particular arrangement of operations of the image compressor 204. The operations may be executed by a single computer system (e.g., computer system 202) or multiple computing devices. Along with being executed at a single site (e.g., at one computer system), operation execution may be distributed among two or more sites.

Operations include receiving 802 an image and separating 804 the image into one or more channels. The image compressor 204 may determine 806 if the channels are evenly divisible by a particular block size (e.g. a four-by-four block)

and pad 808 (e.g., with a value present in the block) one or more of the channels such that each channel is evenly divisible by the block size.

Once each channel has been formatted to be evenly divisible, operations include dividing 810 the channels into blocks and converting 812 the pixel values, for example, from a 16-bit floating point representation into an unsigned integer representation. Pixel conversion may also include adjusting the scale of the pixel values to account for transforming from one representation that includes positive and negative values (e.g., a floating point representation) to a single sign representation (e.g., an unsigned integer representation).

Operations of the image compressor also include computing 814 value differences of adjacent pixels within each block. In some arrangements the difference values are bit-shifted to reduce the amount of data needed to represent the pixel values. To reduce restored pixel value error, operations may include computing and applying an offset (e.g., a value "e") to one or more pre-compressed pixel values to account for the loss of information due to the compression process prior to storing 818 the values.

Figure 9:
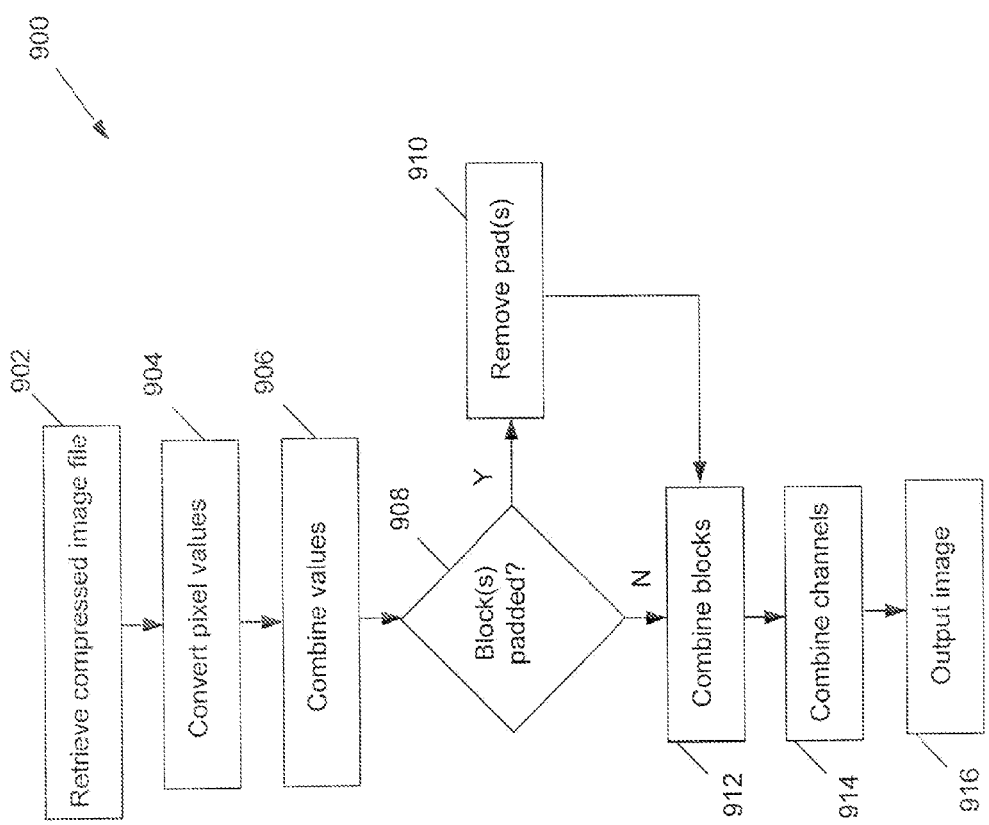
FIGS. 9 and 11 are flowcharts of operations of an image restorer.

Referring to FIG. 9, a flowchart 900 represents a particular arrangement of operations of the image restorer 206. The operations may be executed by a single computer system (e.g., computer system 202) or multiple computing devices. Along with being executed at a single site (e.g., at one computer system), operation execution may be distributed among two or more sites.

Operations include retrieving 902 a compressed image file such as compressed image file 210. From the compressed file, pixel values are retrieved and converted 904 from one representation (e.g., unsigned integers) suitable for compressed channel blocks into another representation (e.g., a floating point representation) of the channel blocks. By combining 906 appropriate pixel values, channel blocks are produced and operations of the image restorer 206 determine 908 if one or more of the channel blocks were padded to attain a particular block size (e.g., a four-by-four block size). For each padded channel block, appropriate pixels are removed 910 that represent the pad values and the appropriate blocks are combined 912 to produce one or more channels. Correspondingly, the channels are combined 914 by operations of the image restorer 206 to produce one more images that are output 916, for example, for further processing and presentation.

Figure 10:
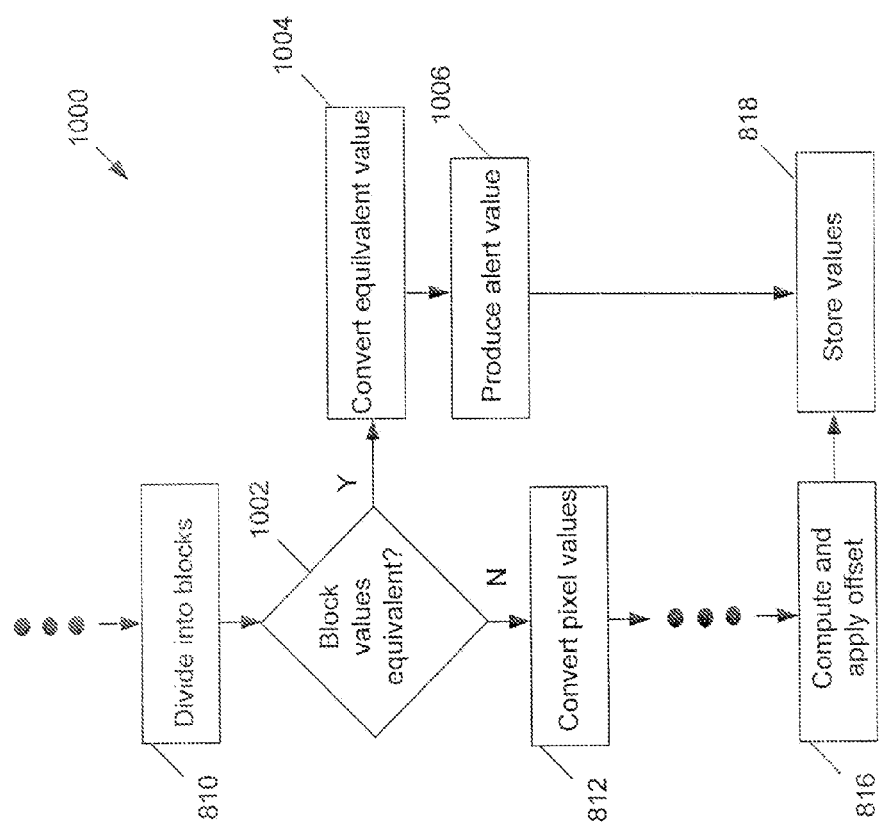

Referring to FIG. 10, other features and functionality may be provided by the image compressor 204 such as detecting flat fields of pixels and storing data to represent the flat fields in a compressed manner. A flowchart 1000 represents a particular arrangement of operations of the image compressor 204 to provide this functionality. In particular, and in conjunction with the flowchart 800 (shown in FIG. 8), upon dividing 810 the channels into pixel blocks, operations may include determining 1002 if the one or more blocks contains a field of equivalent values. If one or more blocks are detected of such flat fields, operations include, for each detected block, converting 1004 the equivalent pixel value from one representation (e.g., floating point representation) to a representation (e.g., unsigned integer representation) suitable for compressing the value. Operations also include producing 1006 a value to provide an alert that a flat field is present in this particular pixel block. Once produced, the converted value and the alert value are stored 818 in a file (e.g., compressed image file 210).

Figure 11:
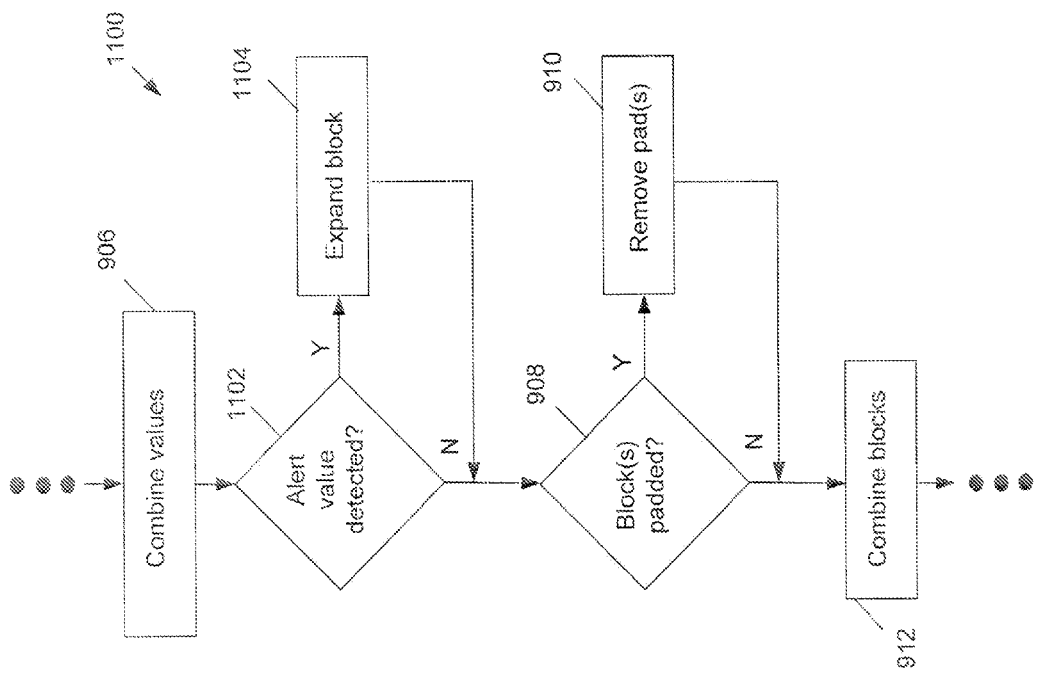

Referring to FIG. 11, similar functionality may be provided by the image restorer 206 to detect flat fields during reconstruction. A flowchart 1100 represents a particular arrangement of operations of the image restorer 206 to provide this functionality. In particular, and in conjunction with the flowchart 900 (shown in FIG. 9), upon combining appropriate pixel values 906, operations may include determining 1102 if one or more alert values are detected 1102. If an alert value is detected (to identify a flat field), the image restorer 206 may expand 1104 the one or more corresponding blocks by using the data (e.g., t[0]) stored with the alert value. Once expanded, or if no alert value is detected, the image restorer 206 continues by determining 908 if one or more blocks are padded (and removing 910 the padding, if present) and combining 912 the blocks into channels.

To perform the operations described in flow charts 800, 900, 1000 and 1100, the image compressor 204 and the image restorer 206 may respectively perform any of the computer-implement methods described previously, according to one implementation. For example, a computer system such as computer system 202 (shown in FIG. 2) may execute the image compressor 204 and the image restorer 206. The computer system may include a processor (not shown), a memory (not shown), a storage device (e.g., storage device 214), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
    dividing, in a processor, an image into one or more image channels representative of one or more display characteristics for image compression;
    dividing at least one of the image channels into at least one block, wherein the at least one block includes floating point representations of pixel values included in the block, the floating point representations having a fixed number of binary digits and including representations of negative values;
    converting the floating point representations of pixel values into unsigned integer representations having a fixed range of values such that the sign corresponding to each floating point representation is preserved, respective values of the unsigned integer representations monotonically tracking the floating point values of the floating point representations, and the fixed range of values of the unsigned integer representations is based upon the fixed number of binary digits of the floating point representations; and
    storing the difference of adjacent unsigned integer representations as a compressed version of the image.

2. The computer-implemented method of claim 1, further comprising storing an integer representation of a first pixel value of the at least one block.

3. The computer-implemented method of claim 1, further comprising storing an integer representative of a number of shift operations.

4. The computer-implemented method of claim 1, further comprising calculating an offset representative of compression error.

5. The computer-implemented method of claim 4, further comprising applying the offset to a first pixel value of the at least one block prior to storing the first pixel value.

6. The computer-implemented method of claim 4, wherein calculating the offset includes selecting a pixel value included in the at least one block.

7. The computer-implemented method of claim 6, wherein calculating the offset includes determining the difference of the selected pixel and a reconstructed version of the pixel.

8. The computer-implemented method of claim 1, wherein dividing the image channel into the at least one block includes determining if the image channel is evenly divisible.

9. The computer-implemented method of claim 8, further comprising padding the at least one block such that the block is evenly divisible.

10. A computer-implemented method comprising: receiving, in a processor, integers representative of the difference of adjacent pixels of a first block of a first image channel that represents a display characteristic, wherein the integers preserve the signs corresponding to associated floating point representations, by being converted from floating point representations having a fixed number of binary digits into unsigned integer representations having a fixed range of values, wherein the unsigned integer representations monotonically track the floating point values of the floating point representations, the fixed range of values of the unsigned integer representations is based upon the fixed number of binary digits of the floating point representations, and the associated floating point representations of the pixel values include representations of negative values; converting the integers into the floating point representations of pixel values of the first block;
    combining the floating point representations of the first block and corresponding floating point representations of a second block to produce the first image channel; and
    combining the first image channel with at least a second image channel for reconstructing a compressed image.

11. The computer-implemented method of claim 10, further comprising determining if pads are applied to the first block.

12. The computer-implemented method of claim 11, further comprising removing pads from the first block prior to combining the first block and the second block.

13. A system comprising:
    a computer system comprising:
    an image compressor configured to:
        divide an image into one or more image channels representative of one or more display characteristics for image compression;

divide at least one of the image channels into at least one block, wherein the at least one block includes floating point representations of pixel values included in the block, the floating point representations having a fixed number of binary digits and including representations of negative values;

convert the floating point representations of pixel values into unsigned integer representations having a fixed range of values such that the sign corresponding to each floating point representation is preserved, respective values of the unsigned integer representations monotonically tracking the floating point values of the floating point representations, and the fixed range of values of the unsigned integer representations is based upon the fixed number of binary digits of the floating point representations; and store the difference of adjacent unsigned integer representations as a compressed version of the image.

14. The system of claim 13, wherein the image compressor is further configured to store an integer representation of a first pixel value of the at least one block.

15. The system of claim 13, wherein the image compressor is further configured to store an integer representative of a number of shift operations.

16. The system of claim 13, wherein the image compressor is further configured to calculate an offset representative of compression error.

17. The system of claim 16, wherein the image compressor is further configured to apply the offset to a first pixel value of the at least one block prior to storing the first pixel value.

18. The system of claim 13, wherein the image compressor is further configured to pad the at least one block such that the block is evenly divisible.

19. A system comprising:
a computer system comprising:
an image restorer configured to:
receive integers representative of the difference of adjacent pixels of a first block of a first image channel representative of a display characteristic, wherein the integers preserve the signs corresponding to associated floating point representations by being converted from floating point representations having a fixed number of binary digits into unsigned integer representations having a fixed range of values, wherein the unsigned integer representations monotonically track the floating point values of the floating point representations, the fixed range of values of the unsigned integer representations is based upon the fixed number of binary digits of the floating point representations, and the associated floating point representations of the pixel values include representations of negative values;
convert the integers into floating point representations of pixel values of the first block;
combine the floating point representations of the first block with floating point representations of a second block to produce the first image channel; and
combine the first image channel with at least a second image channel for reconstructing a compressed image.

20. The system of claim 19, in which the image restorer is further configured to determine if pads are applied to the first block.

21. The system of claim 20, in which the image restorer is further configured to remove pads from the first block prior to combining the first block and the second block.

22. A computer program product tangibly embodied in a non-transitory storage device and comprising instructions that when executed by a processor perform a method comprising:
dividing an image into one or more image channels representative of one or more display characteristics for image compression;
dividing at least one of the image channels into at least one block, wherein the at least one block includes floating point representations of pixel values included in the block, the floating point representations having a fixed number of binary digits and including representations of negative values;
converting the floating point representations of pixel values into unsigned integer representations having a fixed range of values such that the sign corresponding to each floating point representation is preserved, such that respective values of the unsigned integer representations monotonically track the floating point values of the floating point representations, and wherein the fixed range of values of the unsigned integer representations is based upon the fixed number of binary digits of the floating point representations; and
storing the difference of adjacent unsigned integer representations as a compressed version of the image.

23. The computer program product of claim 22, further comprising instructions to store an integer representation of a first pixel value of the block.

24. The computer program product of claim 22, further comprising instructions to:
receive integers representative of the difference of adjacent pixels of the block of the image channel;
convert the integers into floating point representations of pixel values included in the block;
combine the block with another block to produce the image channel; and
combine the image channel with another image channel for reconstructing a compressed image.

25. The computer program product of claim 24, further comprising instructions to remove pads from the block prior to combining the block with the other block.

* * * * *

UNITED STATES PATENT AND TRADEMARK OFFICE
CERTIFICATE OF CORRECTION

PATENT NO. : 8,744,198 B1
APPLICATION NO. : 11/943561
DATED : June 3, 2014
INVENTOR(S) : Florian Kainz It is certified that error appears in the above-identified patent and that said Letters Patent is hereby corrected as shown below:

On the Title Page

At page 1, Item (56), subsection FOREIGN PATENT DOCUMENTS, line 4
  Please delete the duplicate reference "JP 359095647 A * 6/1984 G06F 7/00"

In the Claims

At Column 14, Claim 10, line 34
  Please delete "receiving, in a processor, integers representative of the difference of adjacent pixels of a first block of a first image channel that represents a display characteristic, wherein the integers preserve the signs corresponding to associated floating point representations, by being converted from floating point representations having a fixed number of binary digits into unsigned integer representations having a fixed range of values, wherein the unsigned integer representations monotonically track the floating point values of the floating point representations, the fixed range of values of the unsigned integer representations is based upon the fixed number of binary digits of the floating point representations, and the associated floating point representations of the pixel values include representations of negative values; converting the integers into the floating point representations of pixel values of the first block;"

At Column 14, Claim 10, line 35
  Please insert the following as the first sub paragraph --receiving, in a processor, integers representative of the difference of adjacent pixels of a first block of a first image channel that represents a display characteristic, wherein the integers preserve the signs corresponding to associated floating point representations, by being converted from floating point representations having a fixed number of binary digits into unsigned integer representations having a fixed range of values, wherein the unsigned integer representations monotonically track the floating point values of the floating point representations, the fixed range of values of the unsigned integer representations is based upon the fixed number of binary digits of the floating point representations, and the associated floating point representations of the pixel values include representations of negative values;--

Signed and Sealed this
Fifth Day of August, 2014

Michelle K. Lee
*Deputy Director of the United States Patent and Trademark Office*

CERTIFICATE OF CORRECTION (continued)
U.S. Pat. No. 8,744,198 B1

At Column 14, Claim 10, line 49
    Please insert the following as the second subparagraph --converting the integers into the floating point representations of pixel values of the first block;--